Figure 1:
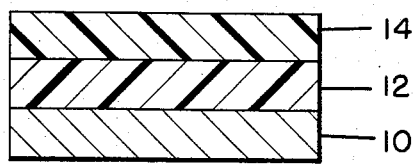

United States Patent [19]

Thompson et al.

[11] Patent Number: 4,513,036
[45] Date of Patent: Apr. 23, 1985

[54] BARRIER LAMINATES FOR CONTAINMENT OF ESSENTIAL OILS AND FLAVORS AND CARTONS MADE THEREFROM

[75] Inventors: Kenneth P. Thompson, Canton, N.C.; Richard C. Ihde, Strongsville, Ohio

[73] Assignee: Champion International Corporation, Stamford, Conn.

[21] Appl. No.: 542,490

[22] Filed: Oct. 17, 1983

[51] Int. Cl.³ .............................................. B32B 27/00
[52] U.S. Cl. ........................................ 428/35; 264/22; 264/80; 428/349; 428/354; 428/513; 428/516
[58] Field of Search ................. 428/537, 507, 35, 347, 428/349, 354, 511, 353; 264/22, 80

[56] References Cited

U.S. PATENT DOCUMENTS

| | | | |
|---|---|---|---|
| 2,918,394 | 12/1959 | Smith | 117/138.8 |
| 3,221,954 | 12/1965 | Lux | 222/566 |
| 3,298,855 | 1/1967 | Helin et al. | |
| 3,480,464 | 11/1969 | Lacy | |
| 3,547,294 | 12/1970 | Williams | 215/1 |
| 3,553,073 | 1/1971 | Rausing et al. | 428/507 |
| 3,567,571 | 3/1971 | Martinovich | 428/40 |
| 3,927,245 | 12/1975 | Roth et al. | |
| 3,940,001 | 2/1976 | Haefner et al. | 215/1 C |
| 3,955,697 | 5/1976 | Valyi | 215/1 C |
| 3,972,467 | 8/1976 | Whillock et al. | 229/14 |
| 4,079,850 | 3/1978 | Suzuki | 215/1 C |
| 4,096,309 | 6/1978 | Stillman | 428/285 |
| 4,109,813 | 8/1978 | Valyi | 215/1 C |
| 4,149,645 | 4/1979 | Valyi | 215/1 C |
| 4,182,457 | 1/1980 | Yamada et al. | 215/1 C |
| 4,239,639 | 12/1980 | Gilbert et al. | 252/90 |
| 4,269,937 | 5/1981 | Asanuma | 428/511 |
| 4,281,045 | 7/1981 | Sumi et al. | 428/516 |
| 4,363,841 | 12/1982 | Snow | 428/35 |
| 4,455,184 | 6/1984 | Thompson | 156/244.11 |

Primary Examiner—George F. Lesmes
Assistant Examiner—E. Rollins Buffalow
Attorney, Agent, or Firm—Evelyn M. Sommer

[57] ABSTRACT

A laminate providing an effective barrier to the migration of essential oils and/or flavorings, such as d-limonene, therethrough is provided comprising, from the outer surface to the inner surface, a paperboard substrate, a web of propylene polymer coated thereon and a web of olefin polymer overlying said propylene polymer web. Preferably the paperboard substrate is also coated on the external surface thereof with a web of heat sealable olefin polymer. Containers constructed from such laminates are especially useful as fruit juice containers which enable significant flavor retention in the fruit juice contained therein over the normal shelf life of the product.

24 Claims, 2 Drawing Figures

BARRIER LAMINATES FOR CONTAINMENT OF ESSENTIAL OILS AND FLAVORS AND CARTONS MADE THEREFROM

This invention relates to barrier laminates for the containment of essential oils and flavors and cartons made therefrom. More particularly, this invention relates to barrier laminates useful in cartons which hold liquids containing essential oils and flavorings such as fruit juices.

For many years, taste and flavor experts have been quite critical of the standard polyethylene coated paperboard containers currently on the market because the essential oils and flavoring contained in fruit juices can diffuse through the polyethylene coating itself to deposit in the paperboard thereby downgrading the initial flavor of the fruit juice in a very marked manner during its standard shelf life.

While the migration of the essential oils and flavorings could be substantially reduced by the use of a laminate containing a metal foil therein mounted as a liner along the interior of the container, the economics involved in using a metal foil preclude this solution from being a viable alternative. Despite the fact that many attempts have heretofore been made to enable the replacement of metallic foil with a polymeric laminate which would enable flavor retention throughout the standard shelf life at a relatively low cost, all such efforts to date have substantially failed to come up with a resonable substitute for metal foil.

Now, in accordance with the present invention, it has been found that a laminate providing a substantial barrier to the migration of essential oils and/or flavors therethrough is achieved by a laminate comprising, from the outer surface to the inner surface contacting said essential oils and/or flavors: a paperboard substrate, a web of propylene polymer coated thereon and a web of olefin polymer overlying said propylene polymer web and rendering the resulting laminate heat-sealable. It has been found that cartons constructed of the laminate of the present invention enable significant flavor retention of the fruit juice contained therein resulting in a significant extension of the shelf life thereof and permit the replacement of an otherwise required aluminum foil barrier at considerable economic savings.

In the container field, it has been common practice to use many forms of materials which are heat-sealed or glued and otherwise converted on conventional equipment to form a container or carton. Such containers are those typically known in the trade as "folding boxes", containers or cartons.

By way of example, one such carton is the gable-top milk carton and carton blanks therefor which are specifically disclosed in U.S. Pat. No. 3,120,333 as liquid-tight containers. Essentially, blanks used in the manufacture of such containers include a paperboard base, extrusion coated on both sides with a resin, such as polyethylene, to provide a moisture barrier and to provide means for heat-sealing the carton.

In a typical carton converting operation, once the resin-blanks are cut and scored, the resin on an outer surface of a glue flap and the resin on an inner surface of a carton panel are heated by direct flame application while the heated carton surfaces extend in guided but essentially unsupported, i.e., not compressed between two heating jaws, condition over the edges of a conveying belt. The carton panels are then folded over to form a a flattened tube, the now molten tacky resin on the heated surfaces are pressed together at a down-stream nip to form as liquid-tight side seam. The cartons, in a flattened tube form, are then shipped to users such as dairies or juice manufacturers where they are finally erected by further heat-sealing, filled and finally sealed.

While these familiar gable-top cartons have been extensively used throughout the United States to contain milk or juices, they are associated with some problems. One such problem results from wetting of the paperboard component of the carton. Pinholing of the resin and film failure or creasing along fold lines are examples of other problem areas where wetting is likely to occur. Moisture is also "wicked", or drawn by capillary action into the paperboard via the exposed paperboard at the edge of the glue flap which resides within the filled carton. Moreover, certain essential oils and/or flavorings, generally found in fruit juices, e.g. apple juice, cranberry juice, grape juice, orange juice, and the like possess the capability of migrating through the polyethylene moisture barrier into the paperboard with resulting loss in flavor of the fruit juice over the normal shelf life.

Many attempts have heretofore been made to overcome the problems of wetting of the paperboard or diffusion of essentil oils through the polyethylene moisture barrier with resultant loss in flavor. One attempt involves the use of a liner for the internal surface of the container comprising a laminate having two or more laminae of polyolefin or other polymeric material sandwiching a metallic foil therebetween. The presence of the metallic foil significantly reduces both moisture transmission and loss of essential oils to the paperboard. The use of metallic foil, however, complicates processing and significantly increases the cost of the resulting product. Other attempts at overcoming these problems have resulted in the suggestion to use homogeneous, all plastic containers such as can be formed by a blowmolding operation. By virtue of the fact that these containers are completely formed and that their transportation thus includes transporting the air in them, shipping charges are substantially increased over shipping charges for similar volume containers which can be shipped in a flattened condition. Moreover, such containers are not readily adaptable to inexpensive printed decorations.

All-plastic carbon blanks cut and scored in patterns similar to those of the resin-coated paperboard cartons described hereinabove have also been developed. However, when these plastic containers are run through a typical resin-coated paperboard converter, extra attention and care has to be taken with the side-seaming by direct flame application to the unconfined container surfaces.

Thus, while homogeneous all-plastic blanks could possibly be sealed by some known heat-sealing technique such as a static system wherein the heated areas are supported or confined, for example, between heating jaws, no such other known techniques are capable of high commercial production speed. Moreover, the use of other sealing techniques would require the converter to purchase other equipment to provide efficient sealing of the all-plastic container rendering the currently available equipment obsolete. Accordingly, such all-plastic containers have not been commercially accepted to any significant degree.

Thus, until the advent of the present invention no suitable containers for the containment of fruit juices have been developed which retain the advantages of using paperboard as the base material and yet eliminate both the processing and economic disadvantages of the use of metal foil.

Figure 2:
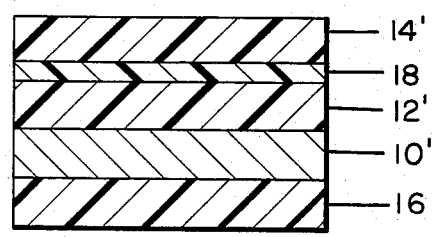

The advantages of the present invention will become more readily apparent from the following detailed description and drawing in which:

FIG. 1 is a cross-sectional elevation of one embodiment of the laminate of the present invention; and FIG. 2 is a cross-sectional elevation of an alternate embodiment of the laminate of the present invention.

The invention described herein is particularly useful as a paperboard laminate employed in the manufacture, for example, of containers of many various types. Such containers, for example, may comprise folding boxes, square or rectangular containers or cartons, or simply cylindrical tubes having a bottom closure means and generally also a top closure means.

For example only, one particular form of container configuration with which the present invention is highly useful is the gable-top carton for the containment of liquids described, for example, in U.S. Pat. No. 3,120,333.

Referring now to FIG. 1, the laminate of the present invention is shown as comprising a paperboard substrate 10 which is most suitably high-grade paperboard stock, for example 0.010 to 0.028 milk carton stock, to which is applied a web of propylene polymer 12 in a coating weight ranging from about 5 to about 20 pounds per ream. Any propylene polymer is currently believed suitable for use herein, for example, polypropylene homopolymer, copolymers of propylene and other olefins copolymerizable therewith wherein the propylene constitutes at least about 75% by weight of the copolymer as well as other modified propylene polymers can be suitably employed. Most preferably, an extrusion coating grade polypropylene is employed. Typical of such suitable extrusion coating grade polypropylene are Gulf polypropylene 7914 and 7917 available from Gulf Oil Chemicals Company, Orange, Tex.

Overlying said polypropylene web 12 is a web of heat-sealable olefin polymer 14. Preferably, the olefin polymer is polyethylene and most preferably, a low density polyethylene. Typical of the preferred low density polyethylenes which can be employed as web 14 is Gulf 4517 polyethylene available from Gulf Oil Chemicals Company, Houston, Tex. The olefin polymer web 14 is applied in a coating weight ranging from about 5 to about 20 pounds per ream. The relative coating weights of the propylene polymers to olefin polymer webs should range from about 50:50 to about 75:25.

Referring now to FIG. 2, wherein like numerals with a prime (') designation designate laminae of the same type described in FIG. 1, an alternate embodiment of a laminate of the present invention is shown. In this alternate embodiment, the paperboard substrate 10' is coated on the external surface thereof with a web of heat-sealable olefin polymer 16', typically polyethylene and most preferably, low density polyethylene. This external coating of olefin polymer imparts heat-sealability to the ultimate container construction and also imparts a gloss to the external surface of the paperboard which, with suitable, yet conventional treatment, can be directly printed upon. On the internal surface of the paperboard substrate 10' is applied a web of propylene polymer 12' as described hereinabove. Overlying the propylene polymer web is a web 14' of heat-sealable olefin polymer which will ultimately form the internal surface of the container constructed therefrom.

To enhance the adhesion between the olefin polymer web 14' and the propylene polymer web 12', an adhesive layer 18 can be interposed therebetween. Although any suitable adhesive can be employed, it has been found that a copolymer of ethylene and methacrylic acid (EMA) is especially suitable. It has been found especially desirable, when employing EMA, to expose the resulting laminate to electron beam radiation in a dosage of about 10 megarads in order to cross-link the EMA and enhance the bondbetween the olefin polymer layer 14' and the propylene polymer barrier layer 12'.

The laminates of the present invention can be easily fabricated. For example, the propylene polymer and olefin polymer webs can be directly coextruded onto the paperboard substrate. Alternatively, in order to facilitate adhesion between the propylene polymer and the olefin polymer, a layer of EMA can be simultaneously coextruded between the propylene polymer and olefin polymer webs as they are directly coextruded onto the paperboard substrate. Still further, if desired, a two-pass coating operation can be employed whereby the propylene polymer web is extruded onto the paperboard substrate and, if desired, the resulting propylene polymer coated paperboard can be treated by flame treatment, corona discharge, or the like to enhance adhesion, and subsequently overcoating the propylene polymer barrier web with a web of olefin polymer.

Although these specific coating techniques have been described, it is apparent to those skilled in the art that any conventional technique for applying the propylene polymer and olefin polymer webs to a paperboard substrate can be suitably employed.

The unique barrier effect provided by the laminate of the present invention to the transmission of essential oils and flavorings is clearly demonstrated by the following comparative example.

Standard paperboard ½ gallon orange juice containers were prepared and filled with orange juice. The principle essential oil in orange juice is d-limonene. The filled cartons were stored for a period of six weeks after which time the orange juice was analyzed to determine the percentage loss by weight of the essential oil d-limonene and the percentage loss by weight of vitamin C.

The standard ½ gallon orange juice container was constructed from a laminate consisting (from the outside of the container in) of 7.8 pounds per ream polyethylene, 0.024 milk carton stock and 20 pounds per ream polyethylene.

Another standard paperboard ½ gallon orange juice container was modified to contain an aluminum foil lining. The structure from the outside of the container in was 7.8 pounds per ream low density polyethylene, 0.024 milk carton stock, 10 pounds per ream low density polyethylene, 0.00035" aluminum foil and 20 pounds per ream low-density polyethylene.

A third comparative container was prepared by modifying the standard paperboard ½ gallon orange juice container to contain a high density polyethylene lining. The structure of this carton from the outside in was 7.8 pounds per ream low density polyethylene, 0.024 milk carton stock, 10 pounds per ream high density polyethylene and 10 pounds per ream low density polyethylene.

Finally, a standard paperboard ½ gallon orange juice container was prepared from the laminate of the present invention comprising from the outside of the container in 7.8 pounds per ream polyethylene, 0.024 milk carton stock, 10 pounds per ream of extrusion coating grade polypropylene and 10 pounds per ream low density polyethylene.

Table I set forth below sets forth the results of the shelf storage life tests after the six week storage period.

TABLE I

| Test Sample | % Loss of Essential Oil | % Loss of Vitamin C |
| --- | --- | --- |
| Standard paperboard ½ gallon orange juice container (polyethylene-paperboard - polyethylene) | 60.5 | 84 |
| Standard paperboard ½ gallon orange juice container modified to contain aluminum foil lining (polyethylene-paperboard-polyethylene-aluminum foil-polyethylene) | 35.5 | 24 |
| Standard paperboard ½ gallon orange juice container modified to contain a high density polyethylene lining (polyethylene-paperboard-10#/ream high density polyethylene-10#/ream low density polyethylene) | 60.5 | 87 |
| Standard paperboard ½ gallon orange juice container constructed from the laminate of the present invention (polyethylene-paperboard-10#/ream polypropylene-10#/ream polyethylene) | 39.5 | 71 |

It can be clearly seen that the container prepared from a laminate of the present invention provided substantially the same barrier to the d-limonene as did the laminate containing the aluminum foil. The container formed from the laminate of the present invention, while not providing as good a barrier to vitamin C as that provided by the container having an aluminum foil liner, nevertheless, provided a better barrier against vitamin C loss than has heretofore been obtainable in the absence of the use of a metal foil liner.

The effectiveness of the laminate of the present invention as a barrier to the migration of essential oils the flavors permits a significant extension of the shelf life of containers constructed therefrom and permits the replacement of an aluminum foil barrier in such containers with resultant significant economic savings.

What is claimed is:

1. A container for liquids containing essential oils and/or flavors constructed from laminate a comprising an outer paperboard layer, a layer of propylene polymer coated on an inner surface of said paperboard layer, and propylene polymer layer having an inner surface which has been treated to enhance adhesion, and a heat sealable layer of an olefin polymer coated on said treated inner surface of said propylene polymer layer.

2. The container of claim 1 wherein said inner surface of said propylene polymer layer has been flame treated to enhance adhesion.

3. The container of claim 1 wherein said inner surface of said propylene polymer layer has been corona discharge treated to enhance adhesion.

4. The container of claim 1 further comprising a layer of adhesive between said propylene polymer layer and said olefin polymer layer to bind the latter to the former.

5. The container of claim 4 wherein said adhesive layer is a layer of ethylene methacrylate.

6. The container of claim 5 wherein said ethylene methacrylate layer is cross-linked.

7. The container of claim 1 wherein said propylene polymer is polypropylene and said olefin polymer is polyethylene.

8. The container of claim 1 wherein the outer surface of said paperboard layer is coated with a layer of a heat sealable olefin polymer.

9. The container of claim 8 wherein the heat sealable olefin polymer is polyethylene.

10. The container of claim 9 wherein the heat sealable olefin polymer is low density polyethylene.

11. A container for liquids containing essential oils and/or flavors construed from a laminate comprising an outer paperboard layer, a layer of propylene polymer coated on an inner surface of said paperboard layer, a layer of ethylene methacrylate polymer adhesive coated on an inner surface of said propylene polymer layer, and a layer of olefin polymer coated on an inner surface of said ethylene methacrylate adhesive layer.

12. The laminate of claim 11 wherein said propylene polymer, said ethylene methacrylate adhesive, and said olefin polymer layers are coextruded onto said paperboard layer.

13. The laminate of claim 1 wherein said ethylene methacrylate layer is cross-linked.

14. The container of claim 11 wherein the outer surface of said paperboard layer is coated with a layer of heat sealable olefin polymer.

15. The container of claim 11 wherein the heat sealable olefin polymer is polyethylene.

16. The container of claim 11 wherein the heat sealable olefin polymer is low density polyethylene.

17. A process for improving the resistance of paperboard to the migration of essential oils and/or flavorings therethrough from a liquid containing such essential oils and/or flavorings, said process comprising the steps of:
 (a) coating an inner surface of said paperboard with a propylene polymer layer;
 (b) treating an inner surface of said propylene polymer layer to enhance its adhesion;
 (c) coating said treated inner surface of said propylene polymer layer with a heat sealable olefin polymer layer, said olefin polymer layer being intended to contact the liquid containing the essential oils and/or flavorings, and
 (d) forming the treated paperboard into a container.

18. The process of claim 17 wherein said adhesion enhancing treating step comprises coating said inner surface of said propylene polymer layer with an ethylene methacrylate layer.

19. The process of claim 17 wherein said adhesion enhancing step comprises flame treating of said inner surface of said propylene polymer layer.

20. The process of claim 17 wherein said adhesion enhancing step comprises corona discharge treating of said inner surface of said propylene polymer layer.

21. The process of claim 17 comprising the additional step of coating the outer surface of said paperboard with a heat sealable olefin polymer.

22. The process of claim 21 wherein the heat sealable olefin polymer is polyethylene.

23. The process of claim 21 wherein the heat sealable olefin polymer is low density polyethylene.

24. A process for improving the resistance of paperboard to the migration of essential oils and/or flavorings therethrough from a liquid containing such essential oils and/or flavorings, said process comprising coextruding a tripartite layer onto said paperboard, said tripartite layer including a component layer of a propylene polymer contacting an inner surface of said paperboard, an intermediate layer of ethylene methacrylate polymer, and an inner heat sealable layer of olefin polymer, and forming the treated paperboard into a container.

* * * * *